United States Patent [19]

Lieberman et al.

[11] 3,737,976
[45] June 12, 1973

[54] METHOD OF FORMING FILAMENT REINFORCED METALLIC SHEETS

[75] Inventors: Irving Lieberman, Covina, Calif.; Robert M. Gray, Atlanta, Ga.

[73] Assignee: Whittaker Corporation, Los Angeles, Calif.

[22] Filed: Apr. 15, 1971

[21] Appl. No.: 71,771

[52] U.S. Cl. .............. 29/470.1, 29/483, 29/488
[51] Int. Cl. ............................ B23k 21/00
[58] Field of Search ............ 29/471.1, 470.1, 29/486, 497.5, 482, 483, 488

[56] References Cited
UNITED STATES PATENTS

| 3,055,095 | 9/1962 | Barry | 29/421 E |
| 3,218,704 | 11/1965 | Kraus et al. | 29/421 E |
| 3,222,144 | 12/1965 | Davenport | 29/470.1 |
| 3,229,364 | 1/1966 | Irvine et al. | 29/421 E |
| 3,419,951 | 1/1969 | Carlson | 29/486 X |
| 3,419,952 | 1/1969 | Carlson | 29/498 X |
| 3,489,534 | 1/1970 | Levinstein | 29/471.1 X |
| 3,609,855 | 10/1971 | Schmidt | 29/471.1 |

Primary Examiner—Richard Bernard Lazarus
Attorney—Donald E. Nist

[57] ABSTRACT

Multi-layer metallic sheet composite structures containing fragile reinforcing filaments are prepared by explosively welding two or more such metallic layers having therebetween relatively fragile reinforcing filaments, the outer surface of which filaments are in supportive contact with ductile metal.

2 Claims, 3 Drawing Figures

PATENTED JUN 12 1973

3,737,976

INVENTORS.
IRVING LIEBERMAN,
ROBERT M. GRAY,
Donald C. Nist
By
ATTORNEY.

METHOD OF FORMING FILAMENT REINFORCED METALLIC SHEETS

BACKGROUND OF THE INVENTION

The use of multi-layer composites reinforced with filamentary materials has recently become of significant importance especially in the preparation of materials which must meet high structural strength requirements. The inclusion of high modulus and tensile strength reinforcing filaments imparts these properties to composites in which they are embedded. Typically, structures of this type comprise resin impregnated fibers in which the resin matrix is shaped and cured. Although similarly reinforced metallic composite structures have been sought, in preparing metallic composites there is a major problem of effectively and efficiently setting or fixing the filamentary or fibrous materials within the composite layers. Fibers having a high modulus of elasticity are often quite brittle and fragile and when subjected to excessive compressive forces the individual filaments rupture or break. Merely placing high modulus filaments between metallic layers and compressing the layers at high temperatures and pressures is generally unsatisfactory because the integrity of the filaments will be significantly adversely affected. Accordingly, where fibers or filaments are placed between flat metallic surfaces and the metal layers are then compressed under high pressures and at temperatures sufficient to fuse or weld the surfaces to one another, the fibers are fractured.

Recently, it has been found that one of the most efficient methods of unifying metallic layer portions is by explosive welding in which metallic surfaces are quickly and efficiently welded due to the impact force of a metal surface propelled into another such surface. A uniform and strong metallurgical bond results at the contacting metal surfaces. However, as effective as this technique is for uniting the metallic layers, where fragile reinforcing filaments are subjected to high and sudden compression between two metallic surfaces, where one or both are explosively driven toward each other, significant degradation of the fibers results.

BRIEF DESCRIPTION OF THE INVENTION

There has been now found a method of incorporating fragile filaments of fibers within a multi-layered metallic composite prepared by explosive welding. The invention comprises explosively welding at least two metallic sheets having between the metallic sheets a plurality of fragile reinforcing filaments. The outer surface of each of the filaments substantially contacts a ductile metal capable of being explosively welded to form a metallic bond with the metallic plates. In one embodiment the filaments of fibers are disposed in a ductile metallic matrix. Preferably the fibers are disposed lengthwise within a ductile metal rod. The rod may be placed between adjacent surfaces of two metallic sheets which are then bonded together by explosive welding.

In another embodiment a metallic sheet contains grooves upon the surface thereof to be explosively welded. Individual filaments or filaments disposed in ductile metal rods are placed in the grooves and an adjacent metallic sheet is then explosively welded to form a unitary reinforced composite. The advantages realized by such a process will be more fully understood and evident from the following detailed description.

DETAILED DESCRIPTION OF THE INVENTION

Figure 1:
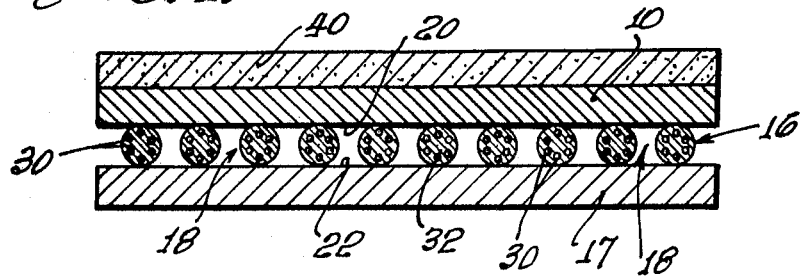
FIG. 1 is a schematic cross-section illustrating one embodiment of means used in the method of the invention, employing a plurality of fiber clusters disposed between metal plates prior to explosive welding.
Figure 3:
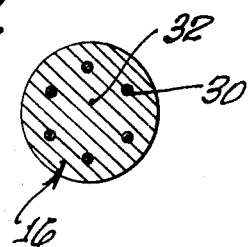

Referring to FIG. 1 two metal plates 10 and 12 are shown separated at their adjacent surfaces 20 and 22 by a plurality of ductile metal rods 16, each containing a number of fibers 30. Fiber-containing rods 16 in the form of clusters 18, shown in magnified view in FIG. 3, comprise a plurality of the reinforcing fibers 30 disposed within a ductile matrix 32. The fibers 30 may be of any desired reinforcing material and preferably are materials having high modulus of elasticity and tensile strength. Examples of such materials are boron, graphite, and the like.

Typically, fiber modulus of elasticity will be about 50,000,000 psi or more with tensile strengths of approximately 400,000 psi. Although such fibrous materials possess the high strength properties noted, they are regarded as fragile in that surface abrasion occurs easily and upon bending or compression, especially in a direction normal to the fiber length, fiber fracture is caused. On the other hand, when the individual fibers are set within a multi-layer metallic composite and the exterior fiber surface the the surrounding composite metal are unified and substantially free of voids, improved products are achieved. In this manner, when the metal-fiber bond is extensive and uniform, the reinforcing fiber becomes a part of the unified metallic composite whereby it exhibits its reinforcing high strength characteristics with no significant damage to the fibers from flexing, movement or impression of the composite.

Referring to FIG. 1, the clusters 18 are placed between the metal surfaces 20 and 22 and explosive 40 located at an outer or opposite surface of one or both of the metal plates is then detonated. For maximum effectiveness, it is desirable to locate the elongated or rod-like clusters 18 essentially parallel to one another between the metal plates 10 and 12, prior to detonation. Further, where maximum composite strength along a given direction or axis is desired, the fibers 30 themselves should be disposed lengthwise along that axis in the finished composite product. This feature will be accomplished by disposing the clusters 18 parallel (and with the fibers 30 lying parallel) to the desired axis. Thereafter, following detonation and explosive welding, the resulting composite will also contain substantially parallel fibers so that maximum strengths along the fiber axis will be achieved. In addition, where the individual fibers 30 are evenly spaced within the clusters 18 and the elongated clusters 18 are also essentially evenly spaced between the metal plates following detonation of explosive charge 40 and welding of the metal plates, the orientation and distance between the set fibers will be essentially uniform.

An important feature of the invention is the extent to which the individual fiber surfaces are in contact or supported by ductile metal at the time of detonation of the explosive welding charge 40. It will be evident in viewing FIG. 3 that each of the individual fibers 30 is substantially in complete contact with the surrounding ductile matrix 32. As the welding explosive is detonated and the metal plate 10 is driven toward the metal plate 12 individual fibers 30 are protected by the supporting ductile metal which during the explosive welding process itself becomes welded to both metal plate surfaces 20 and 22. Rather than being struck or buffeted by compression between impelling metallic surfaces in which only a relatively small portion of the total fiber surface area initially contacts either or both of the metal surfaces, the continuous and uniform support of the surrounding ductile matrix cushions and uniformly distributes forces on the fibers during the explosive welding process. In this manner, the compressive force on the fibers during welding is essentially uniform over the total fiber surface area, which force, unlike uneven forces, the fibers are able to withstand. Thus, the fibers rather than being bent and broken by non-uniformly distributed compressive impact forces between the explosively driven metallic surfaces may be merely repositioned laterally and longitudinally in the weld area while remaining intact during the welding or bonding process.

The matrix may be any metal, metal alloy or the like which is ductile or tractable. Ductile metals are generally considered to be those of Group VIII and IB of the periodic table of elements. Aluminum, tantalum and columbium, as well as alloys containing the aforementioned metals and high and low alloy ductile steels are suitable. It may be preferred that the ductile matrix metal be the same as that used in the metal plates which are to be explosively welded or at least be of a metal which will form a strong bond at the respective plate surfaces utilizing the explosive welding technique. By using such a ductile metal, a unified metallic composite will result from explosive welding.

Figure 2:
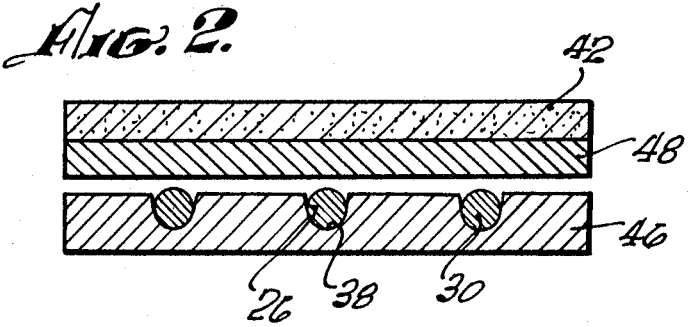
FIG. 2 is a schematic cross-section illustrating a second embodiment of means used in the method of the invention, employing grooves in a metal sheet for positioning reinforcing filaments prior to explosive welding; and, FIG. 3 is an enlarged schematic cross-section of one of the fiber-containing ductile metal rods illustrated in FIG. 1.

Instead of placing the elongated fiber cluster tubes between metal plates, as shown in FIG. 1, the fibers themselves may be placed in grooves 26 located on one of the internal or facing surfaces of the metal plate 46, as shown in FIG. 2. Where uni-directional reinforcement is desired, these grooves will run substantially parallel to one another so that the fibers 30 when placed within the grooves are also parallel to one another along their length. It is preferred that the diameter of each groove closely approximate i.e., be substantially the same as, the diameter of the fiber to be disposed therein. Thus, as shown in FIG. 2, a fiber 30 placed within a groove 26 fits so that a substantial portion of the surface of such fiber lies against and is supported by the groove surface 38 to prevent damage to the fiber during explosive bonding. An upper metal plate 48 is placed on the surface of the lower plate 46 and the plates are explosively welded together by detonating an explosive charge 42. The force of the upper plate 48 as it strikes the lower plate 46 during welding will not shatter the fibers 30 since they are uniformly supported by the underlying groove surfaces 38. Such support effected by groove surfaces 38 acts to buffer the fibers 30 against the shock, as does the ductile matrix described above. However, it will be appreciated, to so act, the plate 46 is to be of a ductile metal or alloy, as previously described. Thus, again, because of substantial fiber support the compressive forces on the fibers are sufficiently cushioned and distributed to avoid shattering the fibers.

Still another alternative is to utilize larger and deeper grooves which will accept a cluster of the fibers set within a ductile matrix rod as described above. In such clusters since the fibers are embedded in and surrounded by the ductile matrix, it is not critical that the elongated cluster be as deeply seated and protected as shown in FIG. 2 for the individual and unprotected fibers. Accordingly, relative to the diameter of the rods, shallow grooves may be used.

The grooves may be set into a plate surface by any suitable manner such as stamping, pressing, rolling, etc. A most useful method is to mill the grooves by a chemical method which involves the use of a caustic or acid solution, as well understood by those skilled in the chemical milling art. The depth and size of the grooves may be varied, depending on the size of the fibers and clusters desired in the composite and concommittant reinforcement characteristics desired.

Preferably, the elongated fiber clusters are positioned to lie parallel to one another between the inner and opposing metal plate surfaces. Some angular variation may be used, although where reinforcement in a specific direction is to be optimum, parallel placement of the clusters is most desirable. Further, as previously noted, uniform spacing between the clusters prior to detonation of the welding explosive yields substantially uniform displacement of the fibers following the explosive welding and a substantially uniform reinforcement. Where multi-directional reinforcement is desired or required, this may be achieved by using a plurality of reinforced metal layers with the direction of placement of the elongated fiber clusters varying between respective layers. Similarly, in the case of individual fibers placed in the grooves as shown in FIG. 2, parallel spacing to yield uniform reinforcement is desired. Alternatively, groove directions within a given plate surface can be varied from area to area in a geometrical pattern to accomplish desired strength distribution.

In carrying out the explosive welding process utilizing sheets with fiber clusters between the sheets, the sheets to be welded together should be properly aligned so that the adjacent edge surfaces of the sheets are substantially parallel. In securing the metal plates or sheets for explosive welding, it is desired that one of the sheets be placed upon a solid surface to provide a firm reinforcement and support. In such instance, the other sheet has an explosive charge uniformly affixed to the top surface opposite the surfaces to be welded. The charge preferably covers an area of the sheet corresponding to the area to be welded.

The explosive may be in the form of pressed or cast conventional explosive or a container enclosing a powdered explosive composition. Such explosive charge is placed on the desired outer surface of the upper plate with an appropriate detonator, preferably electrically actuated. When an actuating current pulse from a source is applied to the detonator, initiation occurs along the length of the explosive, forcing the outer plate downward toward the stationary plate. The explosive detonation produces a shock wave that travels along the upper metal plate driving it downward onto the lower metal plate. A shock generated jet formed from the lower surface of the upper plate and contacting the upper surface of the lower plate results in a metallurgical bond between the metal plate surfaces and the ductile metal matrix of the embedded cylindrical cluster.

The fibers remain intact because the surrounding ductile metal cushions and distributes the sudden force uniformly along the fiber surfaces. In this manner, rather than being bent, broken or crushed by sudden and non-uniform compressive forces, the fibers retain their integrity and are merely relocated or repositioned due to the welding of the ductile matrix to both plate surfaces. The result is a uniform weld along both plate surfaces with the weld area containing the uniformly displaced reinforcing fibers.

When grooves are used on the lower plate surface to contain the fibers, the facing metal sheet surfaces are welded together in the same manner as described above, with the reinforcing fibers being protected along essentially their entire length and surface so as not to be flattened, broken or otherwise having their integrity impaired. These, as well as other objects will be evident to those skilled in the art.

We claim:

1. In a process for explosively welding a first metal sheet to a second metal sheet by detonating an explosive charge located adjacent an outer surface of at least one of said sheets whereby a metallurgical bond is formed along adjacent surfaces of said sheets, which adjacent surfaces are separated prior to said welding, the improvement comprising before said detonating
   a. Providing a plurality of substantially parallel grooves on the inner surface of said first sheet, at least one of said sheets being of a ductile metal, each of said grooves being of a size to supportively contact a substantial surface area of a filament to be fitted therein; and,
   b. Placing a brittle high modulus reinforcing filament in each of said grooves, said filament having a modulus of elasticity of at least about 50,000,000 psi. and tensile strength of at least about 400,000 psi. and a size to be supportively fitted in said groove.

2. The process of claim 1 wherein said filaments are boron.

* * * * *